US011112126B2

(12) United States Patent
Perrin (10) Patent No.: US 11,112,126 B2
(45) Date of Patent: Sep. 7, 2021

(54) METHOD AND DEVICE FOR SAVING HEAT ENERGY AND WATER IN A SANITARY FACILITY

(71) Applicant: David Perrin, La Bresse (FR)

(72) Inventor: David Perrin, La Bresse (FR)

( * ) Notice: Subject to any disclaimer, the term of this patent is extended or adjusted under 35 U.S.C. 154(b) by 56 days.

(21) Appl. No.: 16/310,477

(22) PCT Filed: Jun. 16, 2017

(86) PCT No.: PCT/FR2017/000119
§ 371 (c)(1),
(2) Date: Dec. 17, 2018

(87) PCT Pub. No.: WO2017/216432
PCT Pub. Date: Dec. 21, 2017

(65) Prior Publication Data
US 2019/0346154 A1    Nov. 14, 2019

(30) Foreign Application Priority Data

Jun. 17, 2016 (FR) ........................................ 1670320
Mar. 15, 2017 (FR) ........................................ 1770253

(51) Int. Cl.
*F24D 17/00* (2006.01)
*F04B 41/02* (2006.01)
*F04B 49/02* (2006.01)

(52) U.S. Cl.
CPC .......... *F24D 17/0084* (2013.01); *F04B 41/02* (2013.01); *F04B 49/022* (2013.01)

(58) Field of Classification Search
CPC .. F24D 19/1012; F24D 17/0084; F04B 41/02; F04B 49/022; F24H 9/124; F24C 13/00
See application file for complete search history.

(56) References Cited

U.S. PATENT DOCUMENTS 4,628,902 A * 12/1986 Comber .............. F24D 17/0078
122/13.3
4,738,280 A   4/1988 Oberholtzer
(Continued)

FOREIGN PATENT DOCUMENTS

CN   204944565 U   1/2016
FR     2572790 A1   5/1986
(Continued)

OTHER PUBLICATIONS

International Search Report dated Jan. 1, 2018 in PCT/FR2017/000119.
(Continued)

*Primary Examiner* — Gregory A Wilson
(74) *Attorney, Agent, or Firm* — Steven M. Shape; Dennemeyer & Associates, LLC (57) ABSTRACT

A device for a sanitary facility, intended for rapidly delivering Domestic Hot Water (DHW) to the supply points without wasting energy. The device according to the invention transfers the DHW rapidly from the source to the user as soon as there is a need for it. The method, which prevents any recirculation, makes it possible, in particular, to save the large amount of energy that is systematically wasted each time the DHW is distributed between its source and the supply points. The device essentially consists of a motorised, relatively powerful pump (2) which channels the DHW from the source (1) and injects it into a pipe with a very small cross-section (3) that conveys the entire flow rate required by the user at a high velocity to the supply point (41). An adapted sensor (5) controls the switching on and off of the motor pump (2) upon each use and controls its flow rate on the basis of the requirements. A single device can be used for supplying multiple supply points. It can be fitted to all new or existing facilities.

9 Claims, 6 Drawing Sheets

(56) References Cited

U.S. PATENT DOCUMENTS

| | | | | |
|---|---|---|---|---|
| 5,331,996 | A * | 7/1994 | Ziehm | F24D 17/0078 137/14 |
| 7,000,626 | B1 * | 2/2006 | Cress | F24D 17/0078 137/1 |
| 8,695,539 | B2 * | 4/2014 | Iwama | F24H 9/2028 122/31.1 |
| 8,876,012 | B2 * | 11/2014 | McMurtry | E03B 7/045 236/12.13 |
| 2011/0272132 | A1 * | 11/2011 | Koch | F24D 17/0089 165/287 |
| 2012/0192965 | A1 * | 8/2012 | Popper | E03B 7/04 137/357 |
| 2018/0180303 | A1 * | 6/2018 | Kellicker | F24D 19/1051 |
| 2018/0347830 | A1 * | 12/2018 | Callahan | F24H 1/125 |

FOREIGN PATENT DOCUMENTS

| | | | |
|---|---|---|---|
| JP | S5878025 | A | 5/1983 |
| WO | 2004070279 | A2 | 8/2004 |
| WO | 2010083644 | A1 | 7/2010 |

OTHER PUBLICATIONS

Office Action issued by the Chinese Patent Office in connection with Application No. 201780047794.9 dated May 22, 2020.
Office Action issued by the Chinese Patent Office in connection with Application No. 201780047794.9 dated Mar. 4, 2021.

* cited by examiner

METHOD AND DEVICE FOR SAVING HEAT ENERGY AND WATER IN A SANITARY FACILITY

CROSS-REFERENCE TO RELATED APPLICATIONS

This is a 35 U.S.C. 371 National Stage Patent Application of PCT Application No. PCT/FR2017/000119, filed Jun. 16, 2017, which claims priority to French application 1670320 filed Jun. 17, 2016, and French application no. 1770253 filed Mar. 15, 2017, each of which is hereby incorporated by reference in its entirety.

TECHNICAL FIELD

This invention relates to a method and device intended for rapidly delivering Domestic Hot Water (DHW) to the supply points, for example conventional or mixer taps, without wastage.

STATE OF THE ART

When we open a tap for hot or mixed water, we must generally wait for a few long seconds before the water is actually delivered at our desired temperature. During this time, the supply pipes are needlessly filled with hot water and the drinking water, which is our most precious natural resource, drains directly towards our sewage network. The volume of DHW wasted during each use may reach up to 3 to 5 litres, depending on the pipe configuration. Sometimes we even operate the hot water without thinking and use it at room temperature (cold), without even waiting for the hot water to arrive. The water used is not wasted in this case, but during this phase of use, the supply pipe needlessly fills up with hot water that just gets cold again.

The sum of all these situations represents significant waste, which significantly influences our comfort, our ecosystem and our water and energy bills (on average in France DHW at 65° C. costs about three times more than cold water).

This delay depends mainly on the following factors:
The distance that the DHW must travel before reaching the user
The flow rate of DHW requested by the user
The diameter of the supply pipe
The nature of the piping elements: (for example, steel or plastic pipes).

Normally, in order to obtain DHW at the supply point, we differentiate three flow phases:
At first, the water flows at room temperature; this is the water contained within the supply pipe, which has cooled after the last use.
The water then gradually increases in temperature; this is the DHW coming from the heat source and which cools down as it comes into contact with the different elements of the piping network (distribution manifolds, pipes, connections, flexible sections, taps . . . ) before reaching the user.
Finally the water flows at the requested temperature.

To solve this problem, architects and installers are usually satisfied by placing the heat source for the DHW or the tank as close as possible to the supply points in order to minimise the length of the pipes.

For a more effective solution, certain facilities incorporate:
either a recirculation loop. There are many different versions, in which the hot water circulates in a loop by means of a pump, either intermittently or not, between the DHW heat source and the different supply points. The supply pipes are thus always full of hot water. The biggest disadvantage is that even if the pipes have good heat insulation, the constant heat loss from the fluid makes the process very energy intensive in the long run. This is the solution described in patent application WO2010/083644, which proposes a sanitary facility comprising a circulation drive device, a small-diameter pipe and a sensor that turns the circulation drive device on and off. The low power circulation drive device that ensures the closed loop circulation of a low flow of DHW drawn to the heat source, is activated when the temperature detected in the return circuit lies below a certain set point.
or a small reserve called an under sink water heater, which is bulky, expensive and usually only serves a single tap.
or even a small instantaneous under sink water heater or instantaneous tap that requires considerable electrical power for just a low flow to only a single tap at a time.

In summary, nowadays in order to have quick access to DHW, either it must be close to the supply point when we need it or we must produce it on the spot on demand. This invention makes it possible to solve the drawbacks of sanitary facilities in the prior art.

SUMMARY OF THE INVENTION

The method, according to the invention, for saving heat energy and water in a sanitary facility consisting of a hot water source, at least one supply point and at least one pipe of which the inner cross-section is less than 60 mm2, is characterised in that it comprises the following steps:
detecting a requirement for hot water at the supply point,
instantaneous transfer of a flow of hot water from the source to the supply point through the small diameter pipe using a motorised pump that is controlled according to the requirements at the supply point.

According to a first preferred embodiment, the pressure in the pipe is restored upstream from the supply point in order to provide the standard pressure for sanitary plumbing at the supply point.

According to a second preferred embodiment, the hot water is put under pressure upstream from the small-diameter pipe by means of a motorised pump controlled by detection means in order to quickly deliver the entire flow of hot water required by the user, at their desired temperature, at the supply point.

According to a variant of the invention, the method is implemented in existing conventional sanitary facilities already having at least one conventional pipe for supplying hot water at low pressure between the source of hot water and at least one supply point.

The flow rate in the small diameter pipe is preferably controlled by the user's request at the supply point.

The invention also relates to the device used to implement the invention.

This device allows the instantaneous or almost instantaneous transfer of hot water to the supply points, for example conventional taps or mixer taps. It comprises a source of hot water, at least one supply point and at least one first pipe provided with a first end linked to the source of hot water and a second end linked to the supply point, which device is characterised in that it comprises:
- a motorised pump comprising an inlet that is adapted to be linked to the source of hot water and an outlet,
- at least one second small diameter pipe, comprising a first end linked to the outlet of said motorised pump and a second end adapted to be linked to the second end of the first pipe or to the supply point,
- one or more means of detection for controlling the motorised pump according to the demand of hot water at the supply point.

According to a first preferred embodiment of the invention, the small diameter pipe runs inside the pipe.

According to a second preferred embodiment of the invention, the control means comprise at least one flow sensor to detect the circulation of fluid inside the pipe or a pressure sensor to detect the pressure inside the pipe.

According to a third preferred embodiment of the invention, the flow sensor detects the direction of the flow as well as the absence of flow in the pipe, in order to interpret the demands of the user at the supply point and control the flow inside the pipe, thus avoiding or reducing to a minimum any recirculation of hot water in the pipe.

The method and the device, according to the invention, offer a number of advantages; they allow quickly transferring hot water from the hot water source to the user, whenever it is required. The method is also environmentally friendly; it especially allows saving the large amounts of energy that are systematically wasted when distributing hot water with the facilities of the prior art.

The method and the device according to the invention are relevant to any individual or collective houses but also to industrial buildings, and more generally to any building in which we wish to save sanitary water and energy.

The device according to the invention can be fitted to all piping networks, whether new or pre-existing.

The invention shall be better understood on reading the detailed description and examining the drawings below.

DETAILED DESCRIPTION OF THE INVENTION

Figure 1:
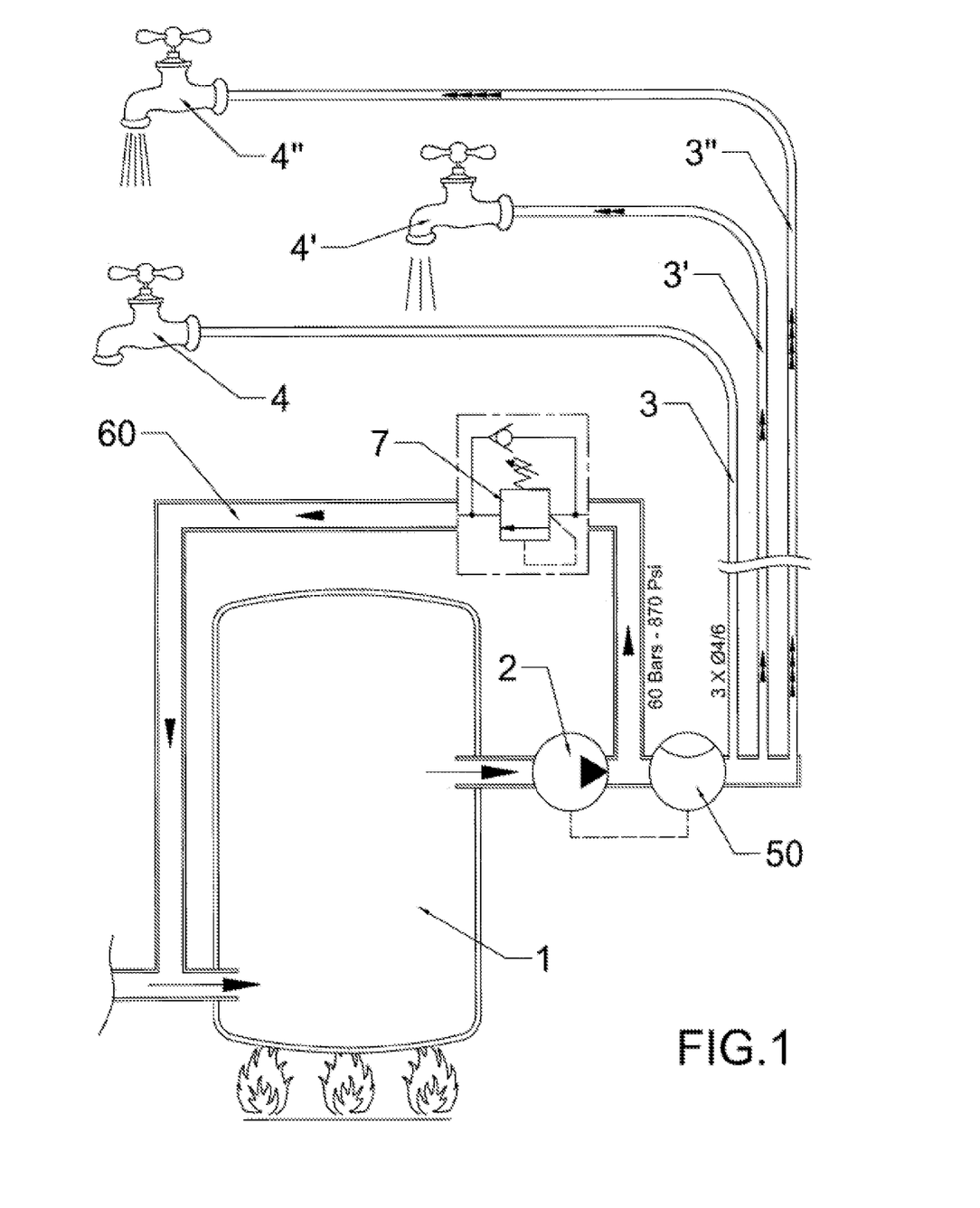
FIG. 1 shows a first embodiment of the device according to the invention.

The operational steps of the device shown in FIG. 1 are:
1) The user opens a tap (4)
2) The flow sensor (50) detects a flow from the source of hot water (1).
3) The motorised pump (2) starts and provides a constant flow of DHW at a predefined pressure to the pressure regulator (7) (for example: 60 bar).
4) According to the demand at the supply point, part of the flow reaches the user through the small diameter pipe (3) and the other part returns to the source through the circuit (60).

Figure 2:
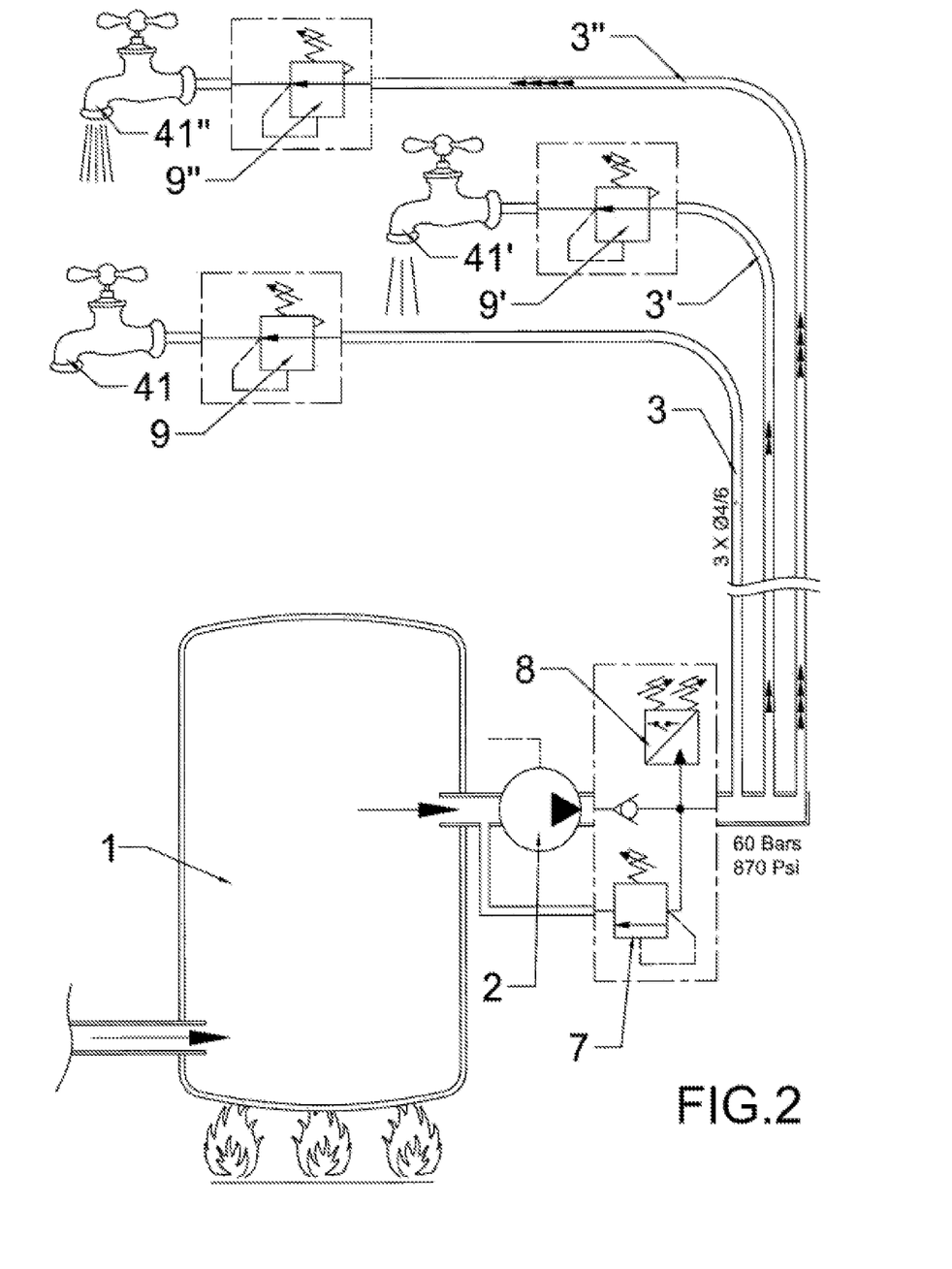
FIG. 2 shows the device of FIG. 1, provided with means for regulating the power of the motorised pump according to demand at the supply point.

FIG. 2 shows a preferred embodiment of the device of FIG. 1, which allows regulating the power of the motorised pump according to demand at the supply point. To do this, a pressure sensor (8) allows maintaining a constant "strong" pressure in the network. As soon as there is a drop in this pressure, such as when a tap is opened or there is a larger flow of DHW, the motorised pump automatically increases its output. And conversely, if the pressure exceeds the setpoint value (for example: 60 bar), as in the case of demanding a small flow, the motorised pump automatically reduces its output until it stops if the tap is closed. To do this, a controller linked to the pressure sensor (8) controls a speed regulator in charge of regulating the rotational speed of the pump motor (2). The pressure regulator (9) allows producing a standard pressure at the supply point (usually 3 bar), thus allowing the use of a standard domestic tap (41).

Figure 3:
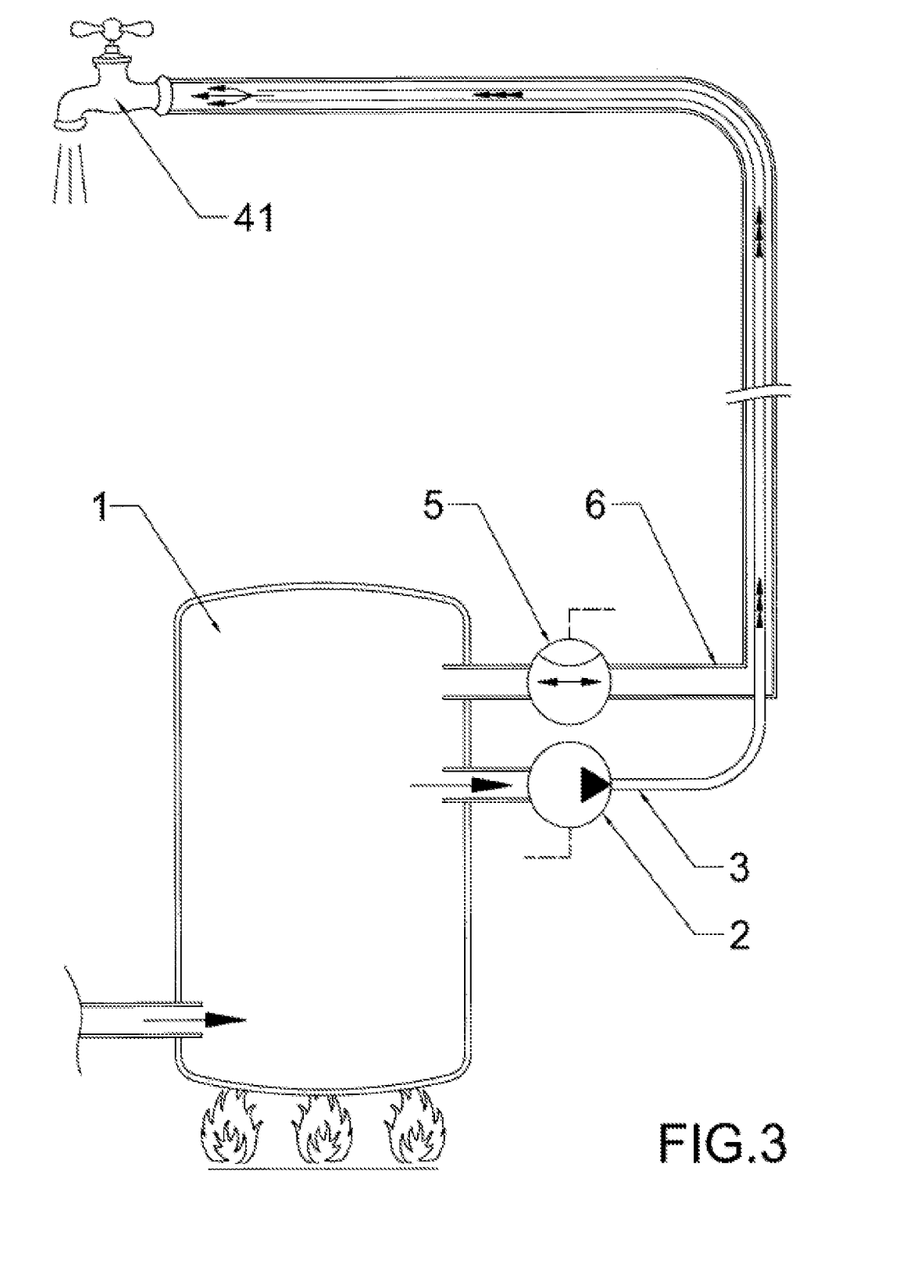
FIG. 3 shows a second embodiment of the device according to the invention.

FIG. 3 shows a device that offers more comfort; it allows obtaining DHW rapidly, whatever the flow rate required. It is easily adapted to an existing facility that already has a pipe (6) for supplying hot water. In contrast to the previous case, it allows obtaining a normal flow of hot water even if the device is out of order. Its environmentally friendly control method prevents any transfer of DHW into the pipe (6) and therefore any recirculation.

The pipe (3) discharges and runs directly inside the pipe (6), as close as possible to the tap. Therefore, the pressure inside the small diameter pipe (3) decreases along its entire length in order to progressively become equal to that of the network, which is usually set to 3 bar. The pipe (6) thus plays a role as a pressure regulator, which allows using standard domestic taps (low pressure).

Figure 5:
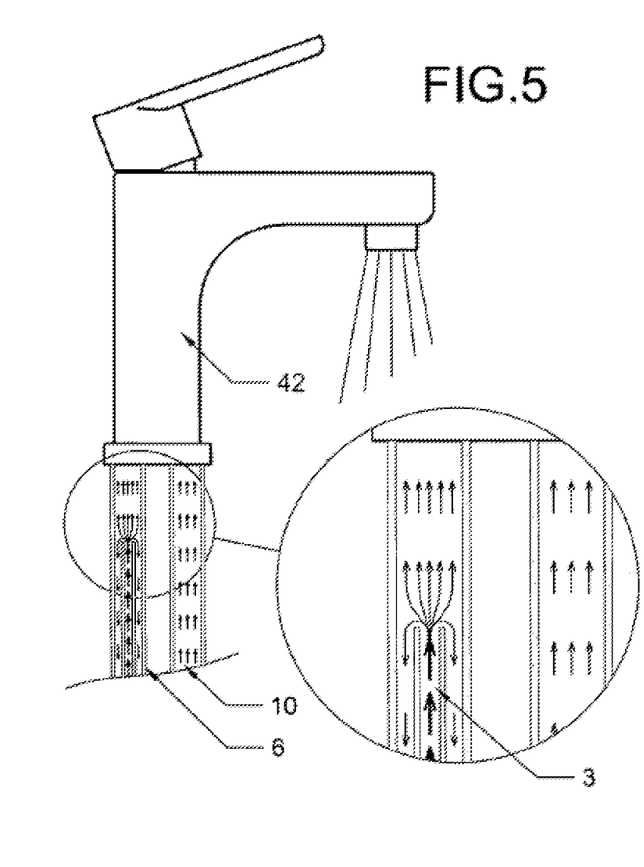
FIGS. 5 and 6 show two examples for connecting and operating (hydraulic flow) the invention at the level of the mixer taps.

Note: For several practical and/or aesthetic reasons, in a new facility or if the existing network allows, the small diameter pipe (3) may be totally or partially inserted into and guided in the pipe (6), up to the tap, using specific connectors (see FIG. 3 and FIG. 5). Or, according to another variant, it could be made an integral part of the pipe (6) during manufacture and form a single pipe with a certain geometric cross-section.

In order to interpret the demand from the user at the supply point, a bidirectional flow sensor (5) allows detecting the direction of the flow as well the absence of a flow in the pipe (6).

Figure 7A:
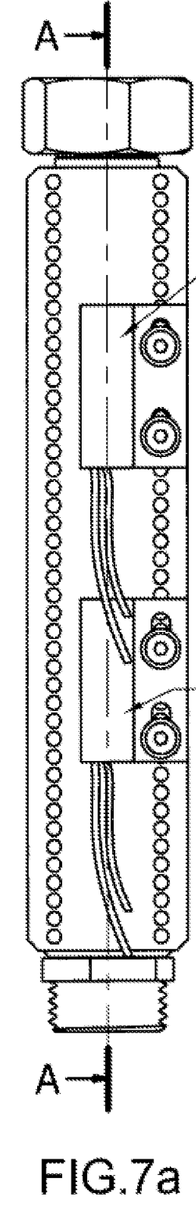
FIGS. 7a, 7b and 7c are three views, consisting of the perspective, plan and cross-sectional views, of a bidirectional sensor fitted in the facility according to the invention.
Figure 7B:
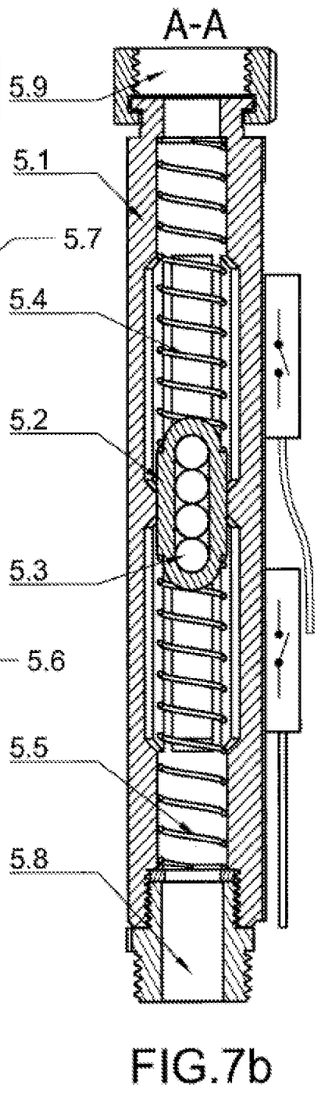
Figure 7C:
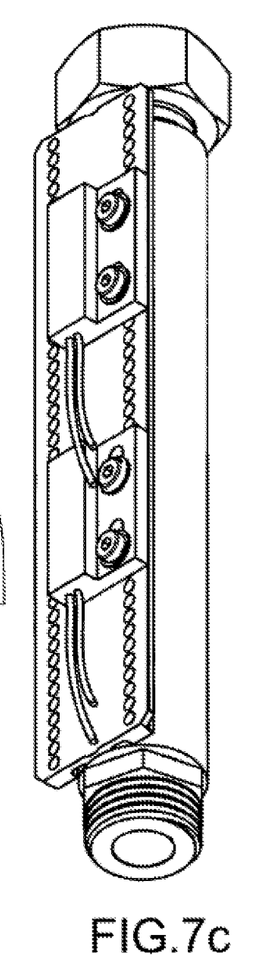

In reference to the FIGS. 7a, 7b, 7c) this bidirectional flow sensor (5) comprises a body (5.1) provided with two ends for connection (5.8 & 5.9), a magnetised slider (5.2 & 5.3) that does not allow passage of fluid in the central position, two springs (5.4 & 5.5) that move the slider back to the central position when there is no flow and two Hall effect sensors (5.6 & 5.7) to detect the slider (5.2 & 5.3) depending on the direction of the flow.

A ½" threaded nut (5.9) located on one end allows connecting the sensor directly on the hot water distribution manifold. And on other end, a standard ½" thread (5.8) allows assembling the internal components and connection of the pipe (6). In the central position, the slider (5.2) blocks the passage of water, which cannot circulate without moving it. Depending on the direction taken by the fluid, the slider is pushed in one direction or another, until the wider diameter of the bore allows it to flow. The sensors (5.6 & 5.7) that switch near the magnets (5.3) can thus indicate to the controller whether or not there is a flow and the direction of the flow.

Note: other technologies may also perform the same function, for example: flow sensors or flow meters which may work by blades, turbine, ionic, ultrasound, vortex, electromagnetic, Coriolis effect, etc., with the information itself being mechanical, analogue, digital, etc.

As above, the controller linked to the flow sensor (5) is the speed regulator, coordinates the distribution cycles and regulates the rotation speed of the motorised pump to regulate its flow rate.

Note: a tap that opens or closes the passage of fluid upstream or downstream from the motorised pump could also change the flow rate (concept not detailed in this description).

Figure 6:
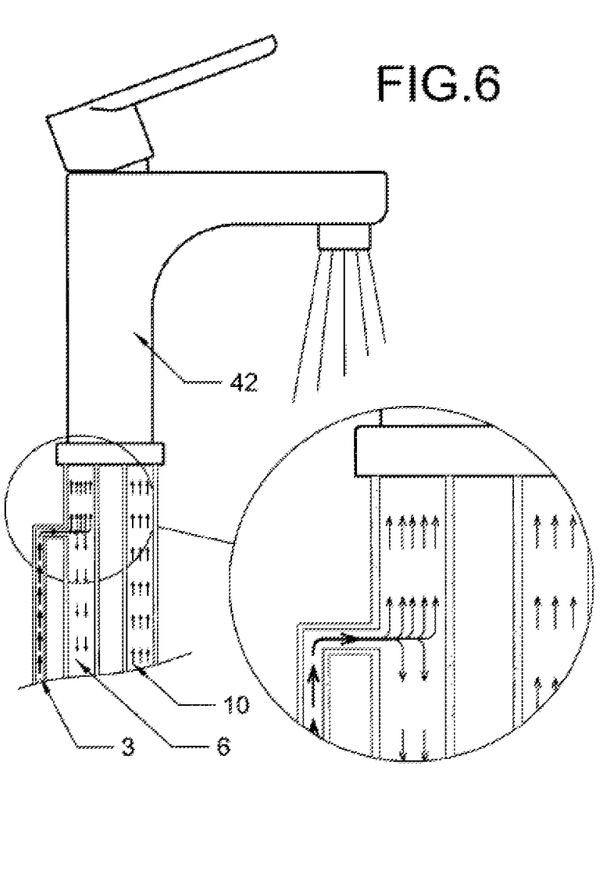

The operating steps are as follows (FIG. 3):
1) The user opens a tap (41)
2) The flow sensor (5) detects a flow from the source (1) towards the user.
3) The motorised pump (2) produces a boost step, which consists in delivering an important flow of DHW during one or two seconds, so that the fluid circulates rapidly and thus rapidly reaches the user.
   During this step, according to the demand at the supply point, part of the flow will reach the user and the other part returns towards the source through the pipe (6) (see FIG. 5 and FIG. 6).
4) The motorised pump then automatically adjusts its flow rate to the requirements of the user as follows: if the flow is moving from the user towards the source, the motorised pump reduces its flow rate, and conversely, if the flow moves from the source towards the user, the motorised pump increases its flow rate.
5) Periodically (for example: once every two days), the controller authorises a return of DHW towards the source through the pipe (6) in order to renew any stagnant water it may contain. This is done in order to limit the proliferation of bacteria and the risk of exposure to the most dangerous of these such as *Legionella*.

Note: a simple flow sensor (unidirectional) placed on the pipe (6) between the supply point and the location at which the small diameter pipe (3) discharges would allow the device to function without being controlled. However, recirculation inside the pipe (6) would make the method just as energy intensive as a conventional facility.

With reference to FIG. 3, as a non-limiting example, the motorised pump (2) is made up of a volumetric gear pump that produces a constant flow of 12 litres/min under a maximum pressure of 70 bar and a 2000 Watt 230V-50 Hz single-phase asynchronous motor. The pipe (3) is made in extruded polyamide with an inner diameter of 4 mm and an outer diameter of 6 mm as commonly used in the industry. The pipe (6) is a cross-linked polyethylene (PEX) model commonly used in sanitary plumbing, with an inner diameter of 13 mm and an outer diameter of 16 mm. The valve (41) is a standard tap used in sanitary plumbing. A programmable controller linked to the bidirectional flow sensor (5), provided with an electric frequency controller regulates the flow rate of the motorised pump.

The user located at a distance of 25 m from the device (eight stories in an apartment building) can thus obtain very hot water in less than 4 seconds.

Figure 4:
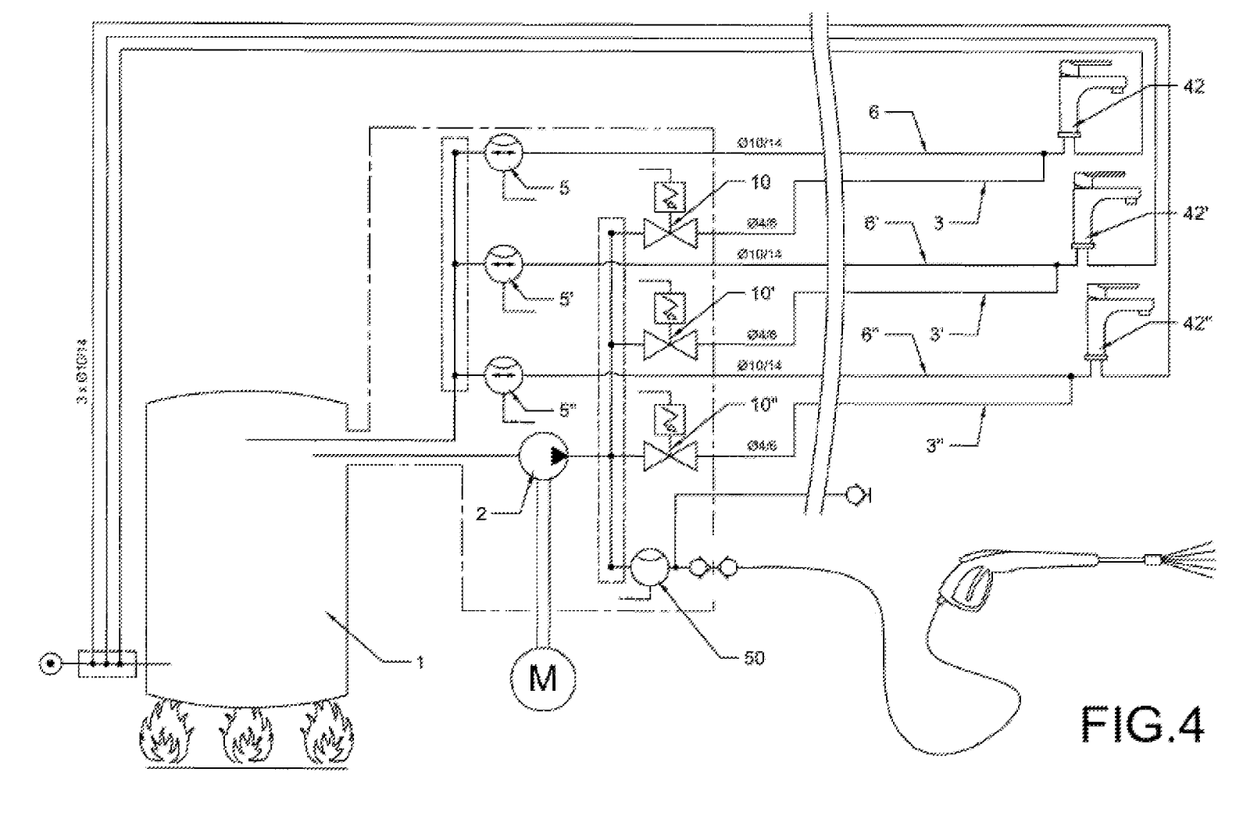
FIG. 4 is the hydraulic diagram of a facility provided with 3 supply points and using the embodiment shown in FIG. 3.

FIG. 4 shows the hydraulic diagram of the device operating as indicated above (FIG. 3), connected to a domestic facility with 3 supply points.

In order to limit the cubic capacity and power of the motorised pump, this device is programmed (not detailed in this description) to feed a maximum of two taps simultaneously. An improbable third user would have to wait for their hot water in the conventional manner. To do this, each circuit must have a solenoid valve (10) to direct the flow of the DHW towards the circuit or circuits activated.

Note: high pressure mechanical valves incorporated into the taps may also provide this same function.

When a circuit is activated, the controller controls the opening and closing of the solenoid valve corresponding to that circuit, as well as simultaneously turning the motorised pump on and off.

Note: The mechanical and electric safety elements, as well as the controller, are not shown in the diagram.

In general, and depending on each sanitary piping and the needs of the user/s, the device may be linked and operate in different ways. According to other non-detailed variants:
  the motorised pump may be of any kind of technology, volumetric or otherwise, and with any kind of power supply (for example: electric, pneumatic, mechanical or hydraulic, etc.).
  the motorised pump may be of a greater cubic capacity in order to simultaneously cater for more supply points (for example: a single device may be used for an entire building).
  the device may use a recirculation loop, via a small diameter pipe network, which would be easier to insulate.
  the motorised pump may deliver water at a temperature controlled by the users requirements.
  automation of the device may by guaranteed by mechanical and/or hydraulic and/or electric logical components . . . or thanks to an electronic circuit, or simply thanks to a controller pre-programmed or that can be programmed by the installer according to the requirements of the user.

The system, consisting of the pump, the different connections and distribution manifolds, must form as compact a block as possible, placed close to the source in order to be rapidly fed with the DHW.

And so that the fluid does not cool down as it passes through, heating means could be incorporated in order to maintain these elements at the same temperature as the source. This function could be ensured by an electric resistor or by circulating a warm fluid.

The system could be provided with peripheral heat insulation in order to limit heat loss and thus limit power consumption.

Note: Ideally, the hot water accumulator tank can be designed and manufactured to house the device so that it forms a single compact unit, practical to connect and remaining at the same temperature as the fluid.

The use of a small diameter pipe provides the following advantages:
  For a given flow rate, the DHW circulates faster and thus reaches the user faster.
  It contains little heat energy, thus limiting the traditional waste during each use.
  The small surface in contact with the DHW limits the cooling of the fluid during as is passes through for the first time.
  It leaves a small volume of water in which bacteria may grow.

Transferring a standard maximum flow rate of DHW through a small diameter pipe to a supply point requires a powerful motorised pump in order to deliver a pressure capable of overcoming any pressure drops.

Note: Pressure drops are largely dependant on the diameter of the pipe, its length, the flow rate and temperature of the water. It is caused by friction of the water moving through the pipe, which is translated into heating (a sufficiently powerful device combined with a pipe of the right diameter and length could replace an instantaneous under sink water heater).

The electrical energy absorbed by the motorised pump that is almost entirely used to overcome these pressure drops shall thus be almost entirely transferred to the water received by the user as heat.

Note: By means of a hydraulic cooling loop, in which for example cold water circulates that is pulsed upstream from the source, the loss of performance in joules from the motorised pump may thus be channeled so it is restored in the water that reaches the user.

In conclusion, whatever the power absorbed by the device, the user shall not see their energy bill increase with its use (in combination with the boiler, the energy bill is zero).

The motorised pump must ideally use a silent and non-vibrating technology. It must have mechanical and/or electric safety elements (for example: relief valve, pressure switch, fuse, etc.). The power required to deliver a standard maximum flow rate of DHW to a single supply point at a time may range from 350 Watts to 3500 Watts depending on the length, diameter of the pipe (3) and performance required. 1500 W for a standard facility, providing a good balance between performance and power, corresponding to a supply pressure of around 60 bar.

Note: in the case of a connection on an instantaneous under sink water heater, the flow rate of the pump must be adapted to the maximum heating power.

Following the general concept of the invention, the motorised pump starts and stops during each use. This function could for example be ensured by a simple manual switch or by a presence sensor, or even by a timer, etc. However, comfort and efficiency shall not be optimal. A flow sensor (unidirectional or bidirectional) or a pressure sensor is used to interpret the requirements of the user at the supply point and thus effectively control the motorised pump during each use, depending on the case.

An additional option for the device allows obtaining a high-pressure water flow directly in order to connect hydraulic accessories (for example: high-pressure hoses or water guns, pipe cleaner, floor brush, hydraulic jack or motor, etc.). Depending on the configuration of the housing unit, the connection may be made directly to the unit or on an additional pipe that runs, for example, permanently to the outside of the housing unit.

The addition of specific components not detailed in this description may allow regulating the working pressure, the flow rate, the temperature and the possibility of providing an additive in the water (for example: soap, defoamer, etc.).

The device according to the invention is mostly intended for limiting the waiting time, the wasting of drinking water and the waste of energy when a user requires hot or mixed water at a sanitary water supply point. The method allows the heat source to remain at a considerable distance from the supply points, thus reducing eventual problems of size, aesthetics and/or risk of discharging waste water into the environment. One option for the device allows connecting it with a hose and water gun for high-pressure cleaning.

The invention claimed is:

1. A method for saving heat energy and water in a sanitary facility comprising a hot water source (1), at least one supply point (4), and at least one pipe (3), wherein the at least one pipe (3) has an inner cross-section area less than 60 square millimeters (mm$^2$), said method comprising:
   detecting a requirement for hot water at the at least one supply point (4); and
   instantaneously transferring a flow of hot water from the hot water source (1) to the at least one supply point (4) through the at least one pipe (3) using a motorized pump (2) controlled according to the requirement for hot water at the at least one supply point (4),
   wherein the hot water is under pressure upstream from the at least one pipe (3) by the motorized pump controlled by a detection means in order to quickly deliver a flow of hot water required by a user at a desired temperature at the at least one supply point (4).

2. The method according to claim 1, wherein a pressure in the at least one pipe (3) is restored upstream from the at least one supply point (4) to provide a standard pressure in sanitary plumbing at the at least one supply point (4).

3. The method according to claim 1, wherein the method is implemented in existing conventional sanitary facilities having a conventional pipe for supplying hot water (6) at a low pressure between the hot water source and the at least one supply point (4).

4. The method according to claim 1, wherein a flow rate in the at least one pipe (3) is adapted to a demand of a user at the at least one supply point (4).

5. A device for the instantaneous transfer of hot water for implementing the method according to claim 3, the device comprising:
   a first pipe (6) having a first end coupled to the hot water source and a second end coupled to the at least one supply point (4);
   the motorized pump (2) comprising an inlet configured to couple to the hot water source and an outlet;
   at least one second small diameter pipe (3) comprising a first end coupled to the outlet of the motorized pump and a second end configured to couple to the at least one pipe (3) or to the at least one supply point (4); and
   a controller configured for controlling the motorized pump according to a demand of hot water at the at least one supply point (4).

6. The device for the instantaneous transfer of hot water according to claim 5, wherein the at least one second small diameter pipe (3) runs inside the first pipe (6).

7. The device for the instantaneous transfer of hot water according to claim 5, wherein the controller comprises at least one flow sensor (5) to detect a circulation of fluid in the first pipe (6) or a pressure sensor (8) to detect a pressure in the at least one pipe (3).

8. The device for the instantaneous transfer of hot water according to claim 7, wherein the at least one flow sensor (5) detects the direction of the flow as well as an absence of flow in the first pipe (6), such that the device is configured to interpret the demand of the user at the at least one supply point in order to control a flow rate in the at least one pipe (3), thus preventing or reducing to a minimum any recirculation of hot water in the first pipe (6).

9. A bidirectional flow sensor (5) for the device for the instantaneous transfer of hot water according to claim 8, wherein the bidirectional flow sensor (5) comprises:
   a body (5.1) having a first end (5.8) and a second end (5.9);
   a magnetized slider (5.2, 5.3) configured to prevent the flow of hot water in a central position;

a first spring (5.4) and a second spring (5.5) configured to move the magnetized slider to the central position when there is no flow of hot water; and two Hall effect sensors (5.6 & 5.7) configured to detect the magnetized slider (5.2 & 5.3) depending on a direction of the flow of hot water.

\* \* \* \* \*